United States Patent
Lenherr et al.

(10) Patent No.: US 7,581,637 B2
(45) Date of Patent: Sep. 1, 2009

(54) FEEDING DEVICE FOR A PACKAGING MACHINE

(75) Inventors: Harald Lenherr, Beringen (CH); Cyrille Fuellemann, Schaffhausen (CH)

(73) Assignee: Robert Bosch GmbH, Stuttgart (DE)

(*) Notice: Subject to any disclaimer, the term of this patent is extended or adjusted under 35 U.S.C. 154(b) by 16 days.

(21) Appl. No.: 11/910,341

(22) PCT Filed: Feb. 24, 2006

(86) PCT No.: PCT/EP2006/060255

§ 371 (c)(1),
(2), (4) Date: Oct. 1, 2007

(87) PCT Pub. No.: WO2006/106014

PCT Pub. Date: Oct. 12, 2006

(65) Prior Publication Data

US 2008/0217137 A1 Sep. 11, 2008

(30) Foreign Application Priority Data

Apr. 8, 2005 (DE) .................. 10 2005 016 119

(51) Int. Cl.
*B65G 19/00* (2006.01)
(52) U.S. Cl. .................. 198/728; 198/725; 198/459.8
(58) Field of Classification Search ............... 198/459.8, 198/718, 725, 728, 729, 732
See application file for complete search history.

(56) References Cited

U.S. PATENT DOCUMENTS

| 2,090,928 | A | 8/1937 | Aisher | |
|---|---|---|---|---|
| 3,232,414 | A * | 2/1966 | Brigham et al. | 198/725 |
| 3,677,686 | A | 7/1972 | Powel | |
| 4,417,653 | A | 11/1983 | Zwezerynen | |
| 5,042,636 | A * | 8/1991 | Underwood | 198/732 |
| 5,937,999 | A * | 8/1999 | Spatafora | 198/728 |
| 6,378,693 | B1 * | 4/2002 | Ballestrazzi et al. | 198/732 |
| 6,662,933 | B2 * | 12/2003 | De Guglielmo et al. | 198/732 |
| 2001/0032775 | A1 | 10/2001 | Guglielmo et al. | |
| 2002/0008002 | A1 | 1/2002 | Guglielmo et al. | |
| 2002/0043446 | A1 | 4/2002 | Guglielmo et al. | |

FOREIGN PATENT DOCUMENTS

FR   2 448 975      9/1980
GB   2 056 394 A    3/1981

* cited by examiner

*Primary Examiner*—James R Bidwell
(74) *Attorney, Agent, or Firm*—Ronald E. Greigg

(57) ABSTRACT

A feeding device for a packaging machine used to feed individual goods to a packaging station of the machine includes at least one continuously rotating conveyor which comprises at least one driver element used to drive the individual goods, which are to be guided, along a conveyor path. The inventive feeder device is embodied in such a manner that, for each conveyor, only one individual driver element can be placed in a driving position of the individual goods which are to be guided at any one time. The device reduces the feeding path of a packaging machine and also increases the position precision of the individual goods.

13 Claims, 4 Drawing Sheets

FEEDING DEVICE FOR A PACKAGING MACHINE

CROSS-REFERENCE TO RELATED APPLICATION

This application is a 35 USC 371 application of PCT/EP 2006/060255 filed on Feb. 24, 2006.

BACKGROUND OF THE INVENTION

1. Field of the Invention

The invention relates to an improved feeding device of a packaging machine and to an improved method for feeding bulk products into a packaging station of a packaging machine.

2. Description of the Prior Art

Feeding devices of the type with which this invention are concerned are known for instance from U.S. Pat. Nos. 3,417,544, 6,122,898, and 5,689,942. These publications disclose horizontal bag-making machines in which bulk products are individually delivered to a folding station, where they are encased with packaging film and the film is shaped into individual tubular bags; they are supplied with sealing seams, and the individual bags are cut apart from one another. So that the individual bulk products will arrive in a predefined spacing in the folding station, they are engaged beforehand by a revolving driver element chain, and each bulk product is transported by its own driver element and transferred to the folding station. Typically, a leading span is located upstream, in the conveying direction, of this driver span, and in the leading span the products are given a predetermined spacing and are thus transferred incrementally to the feeding conveyor.

These feeding devices have indeed proven themselves in practice. However, it is disadvantageous that the delivery span, that is, the leading span and the length of the feeding device, requires a relatively large amount of space.

SUMMARY AND ADVANTAGES OF THE INVENTION

It is an object of the invention to shorten the delivery span of a packaging machine, in particular a horizontal bag-making machine.

In the attainment of this object, feeding device of the invention for a packaging machine for feeding bulk products into a packaging station of this machine has at least one endlessly revolving conveyor with at least one driver element for driving the bulk products to be fed along a conveyor path. The feeding device is embodied such that per conveyor, only a single one of this at least one driver element can be put simultaneously into a position that drives a bulk product that is to be fed.

The feeding device is especially, but not exclusively, suitable for use in a horizontal bag-making machine.

Since only a single bulk product at a time, rather than a plurality of bulk products, is transported simultaneously per conveyor, the delivery span can be shortened. The shortening can be improved still further if an accelerating conveyor is used in the leading span. Since the bulk products are subsequently conveyed individually to the accelerating conveyor and at mutually independent speeds to the packaging station, they can have a relatively slight spacing from one another on the accelerating conveyor.

A further advantage is that an indexing belt in the leading span is unnecessary.

If the speed of the driver element is adapted to the position at the time of the bulk product, then incorrect positions can be corrected, and the bulk product can be transferred positionally precisely to the packaging station. That is, bulk products located too close to the next bulk product ahead of them in the in the column of bulk products finished along the leading span can be slowed down by means of the driver element, and the spacing from the neighbor ahead can thus be increased. Bulk products that trail behind, or in other words are spaced too far apart from the next bulk product ahead, can be speeded up by means of the driver element and the spacing can be reduced. In both cases, preferably virtually all the bulk products are pushed by means of their driver elements, until they have reached their desired position.

Preferably, at the latest shortly before the transfer of the bulk product to the transporting means of the packaging station, the driver element is brought to the conveying speed that this transporting means is also at. The transporting means, in a horizontal bag-making machine, is typically the packaging material or the packaging film itself, so that the speed of the driver element is adapted to the conveying speed of the tube.

For driving the driver elements or their conveyors, servo motors are preferably used.

A her advantage of the device of the invention is that for the same feeding capacity, the bulk products can be transferred to the packaging station at a relatively slight conveying speed. Because of the more-precise positioning of the bulk products in the tube, a somewhat shorter length of film drawn off can be allowed. This means that the tube speed can be reduced somewhat as well.

It is also advantageous that the same feeding device can be used for different sizes of bulk products. The spacing between the individual driver elements is no longer important. As a result, upon a change of the type of bulk product, the pitch of the driver elements on the conveyor no longer has to be changed, so that changing driver elements becomes unnecessary.

Thanks to the device of the invention, it is possible to shorten the delivery span, depending on the system, by from 500 to 800 mm, for instance.

BRIEF DESCRIPTION OF THE DRAWINGS

One exemplary embodiment of the invention will be described in further detail herein with reference to the drawings, in which.

DESCRIPTION OF THE PREFERRED EMBODIMENT

Figure 1:
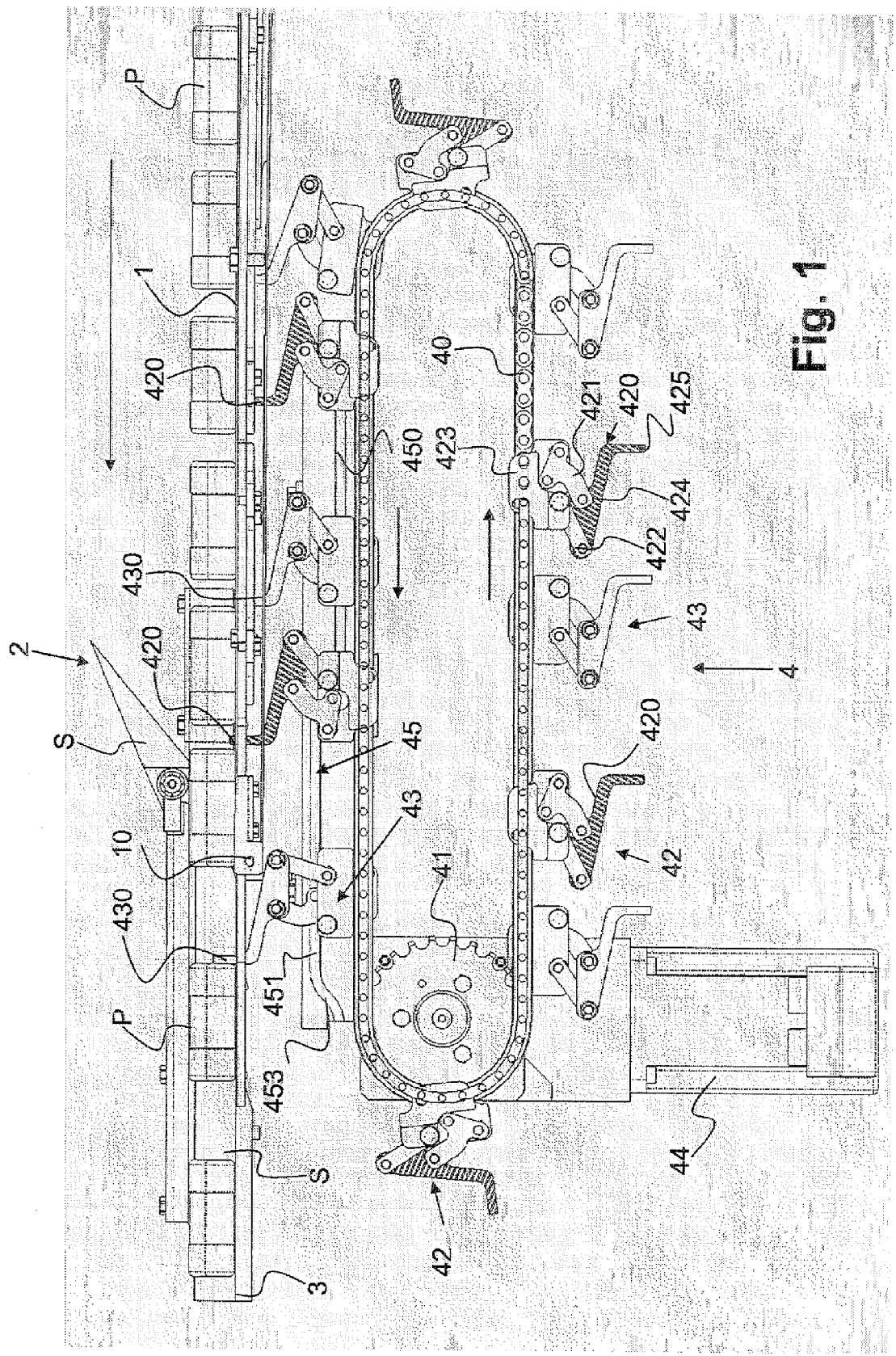
FIG. 1 is a side view of a feeding device of the invention and a part of a packaging station, in a first conveying position.

In the example shown in the drawings, the packaging machine is a horizontal bag-making machine; that is, the bulk products are fed individually to a packaging material S, in particular a packaging film, which is folded around the individual bulk products P, provided with sealing seams, and cut apart into individual bags. Horizontal bag-making machines of this kind are well known in the prior art and will therefore not be described in further detail here.

The bulk products P are brought by a conveyor 1. Preferably, his is an accelerating conveyor 1, which brings the bulk products P. The spacings between the individual bulk products are relatively short. This accelerating conveyor 1 may be formed by at least one endlessly revolving conveyor, a conveyor chain, or some other suitable conveying means. Its conveying direction is represented in the drawings by an arrow. The lower end, in terms of the conveying direction, of the accelerating conveyor 1 is formed by a deflection roller 10.

Adjoining this accelerating conveyor 1 is the packaging station 2 with its transporting means; this station extends the delivery span in a straight line. The transporting means 3 in this preferred example is formed by the bottom of the tube S, on the bottom of which the bulk products P rest.

The feeding conveyor 4 of the invention is disposed below the conveyor path, in the transition region from the accelerating conveyor 1 to the packaging station 2, that is formed by the delivery span and the conveying span of the packaging station. It may also be disposed laterally of the conveyor path or above it.

This feeding conveyor 4 is disposed on a load-bearing frame 44. It has at least one and in this case two endlessly revolving conveyor chains 40, 40'. Instead of the conveyor chains 40, 40', still other conveying means may be employed. The conveyor chains 40, 40' are driven via drive wheels 41 and preferably via servo motors, and a central controller triggers these motors.

At least one driver element 42, 43 is disposed on each of these conveyor chains 40, 40' and is movable by means of them. In the preferred exemplar embodiment shown here, a plurality of driver elements 42, 43 per conveyor chain 40, 40' are secured, spaced apart from one another, to the chains 40, 40'. The driver elements 42 of the first chain conveyor 40 are shown shaded, while the driver elements 43 of the second chain conveyor 40' are represented only by their outlines. The use of two or more conveyors 40, 40' has the advantage that a plurality of bulk products P can be transported simultaneously by means of driver elements, and thus the throughput can be increased, without sacrificing flexibility in terms of transporting the individual bulk products P or having to increase the conveying speed in the packaging station 2.

Each driver element 42, 43 has a driver carriage 423, which is secured nondisplaceably and positionally fixedly on one or more chain links of the conveyor chain 40. One end of a first swivel plate 421 and one end of a second swivel plate 422 are each pivotably secured to this driver carriage 423. The other ends of the swivel plates 421, 422 are joined by a driver element arm 420. This driver element arm 420 is essentially L-shaped; the two ends of the swivel plates 421, 422 are pivotably secured, spaced apart from one another, to its long leg 424, while its short leg 425 points away from the conveyor chain 40. Preferably, the short leg 425 protrudes approximately perpendicularly from the conveyor chain 40. Because of the parallel fastening of the swivel plates 421, 422, an at least approximately rectilinear raising and lowering of the driver element arm 420, and in particular of the short leg 425, is possible.

The feeding conveyor 4 furthermore includes at least one slide track 45, which extends parallel to the at least one conveyor chain 40, 40'. The slide track 45 extends parallel to the particular span of the feeding conveyor 4 that is oriented toward the packaging station 2. In this example, this is the upper run of the feeding conveyor 4.

Figure 4:
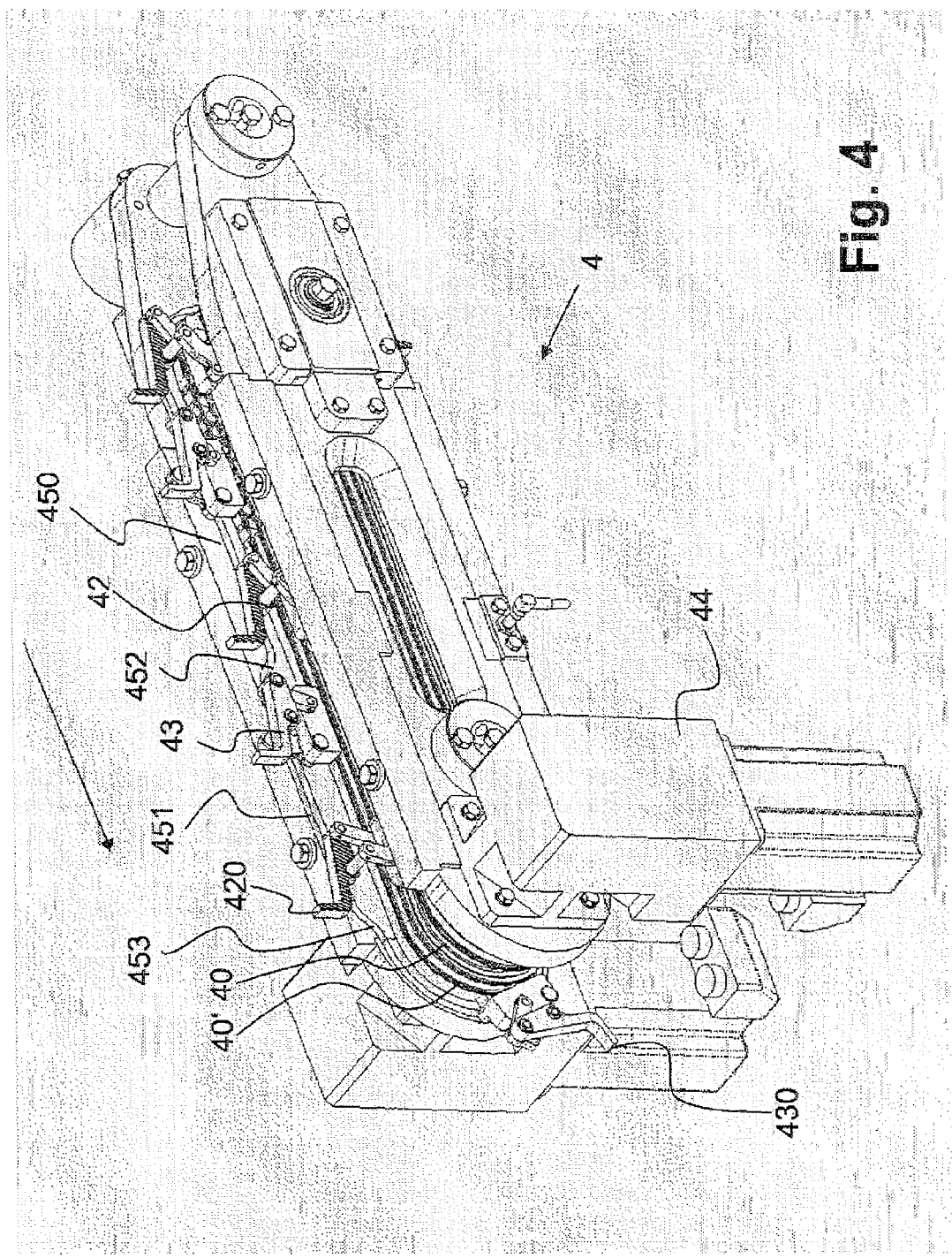
FIG. 4, a perspective view of the device of FIG. 1.

If two or more conveyor chains 40, 40' are present then preferably each conveyor chain 40, 40' has its own slide track 45. This slide track 45 has a lowered span portion 450 and a raised span portion 451, which merge with one another via a ramp 452. The slide track 45 and in particular the ramp 452 can be clearly seen in FIG. 4.

Either every driver element arm 420, every first swivel plate 421, or every second swivel plate 422 has a protruding engagement means, such as a bump, which rests on the slide track or, if it is embodied as a groove, engages it. As a result, on traversing the upper run of the feeding conveyor 4, each driver element arm 420 rises from a lowered state along the lowered span portion 450 of the slide track 45 to a raised state along the raised span portion 451. At the end of the curved path 45, or in other words shortly between the transition from the upper run to the lower run, the curved path 45 descends again. The driver element which extends along this final span 453 thus dips out of the conveyor path again and vanishes from the region of the packaging station 2. The feeding device is designed in such a way, or in other words the spacings between the driver elements 42, 43 of the same chain conveyor 40 relative to the slide track 45 are selected such, that only a single driver element 42, 43 at a time is located on the raised span portion 451 and is thus in the raised state. This too is clearly seen in FIG. 4.

This raising and lowering of the driver element arm 420, 430 is now utilized for transporting the individual bulk products in the desired manner. This will be described below in conjunction with FIGS. 1 through 3.

In FIG. 1, the frontmost driver element 43, in terms of the conveying direction, of the second chain conveyor 40 is located in the raised span portion 451 of the slide track 45, and is thus in driving engagement with a bulk product P. The following driver elements 43 on this chain conveyor 40' are located in the lowered span portion 450 and thus do not protrude into the conveyor path. The bulk products P disposed above them continue to be transported solely by the accelerating conveyor 1. The frontmost driver element 42, in terms of the conveying direction, of the first chain conveyor 40 is located precisely on the ramp 452 of the slide track 45, so that the driver element arm 420 is now raised into the conveyor path.

The position of this first, frontmost driver element 42 and its speed are independent of the position of the above-described second, frontmost driver element 43 and are dependent only on the position of the bulk product P to be driven, or in other words delivered to the packaging station. If the bulk product P is located too far forward, then the conveyor chain 40' and thus the first driver element 42 are driven more slowly in order to increase the spacing between this bulk product P and the hulk product P ahead of it. If the bulk product P is located too far to the rear, then the first driver element 42, as soon as it contacts this bulk product, is speeded up in order to push it forward and to reduce the spacing from the bulk product P ahead of it.

These positions of the bulk products P are preferably detected on or in front of the accelerating conveyor 1 by means of at least one sensor and reported to the central controller. This controller then controls the speeds of the at least one chain conveyor 40, 40'. If there are more than one chain conveyor 40, 40', then they are preferably triggered independently of one another.

In a preferred embodiment, between the sensor and the feeding conveyor 4 there is at least one ejector means, such as an arm that can be pivoted into the delivery span and that removes individual bulk products P from the delivery span. The criteria for ejection may be for instance if the position of bulk product P is located outside a predetermined position range, or if a bulk product that has not yet been packaged has damage.

Preferably all the driver elements 42, 43 in the region of the final span 453 have the same speed as the transporting means 3 of the packaging station 2, or in other words the tube formed here from the packaging material S. This enables a transfer, with as little force as possible, of the bulk products P to this transporting means 3.

Figure 2:
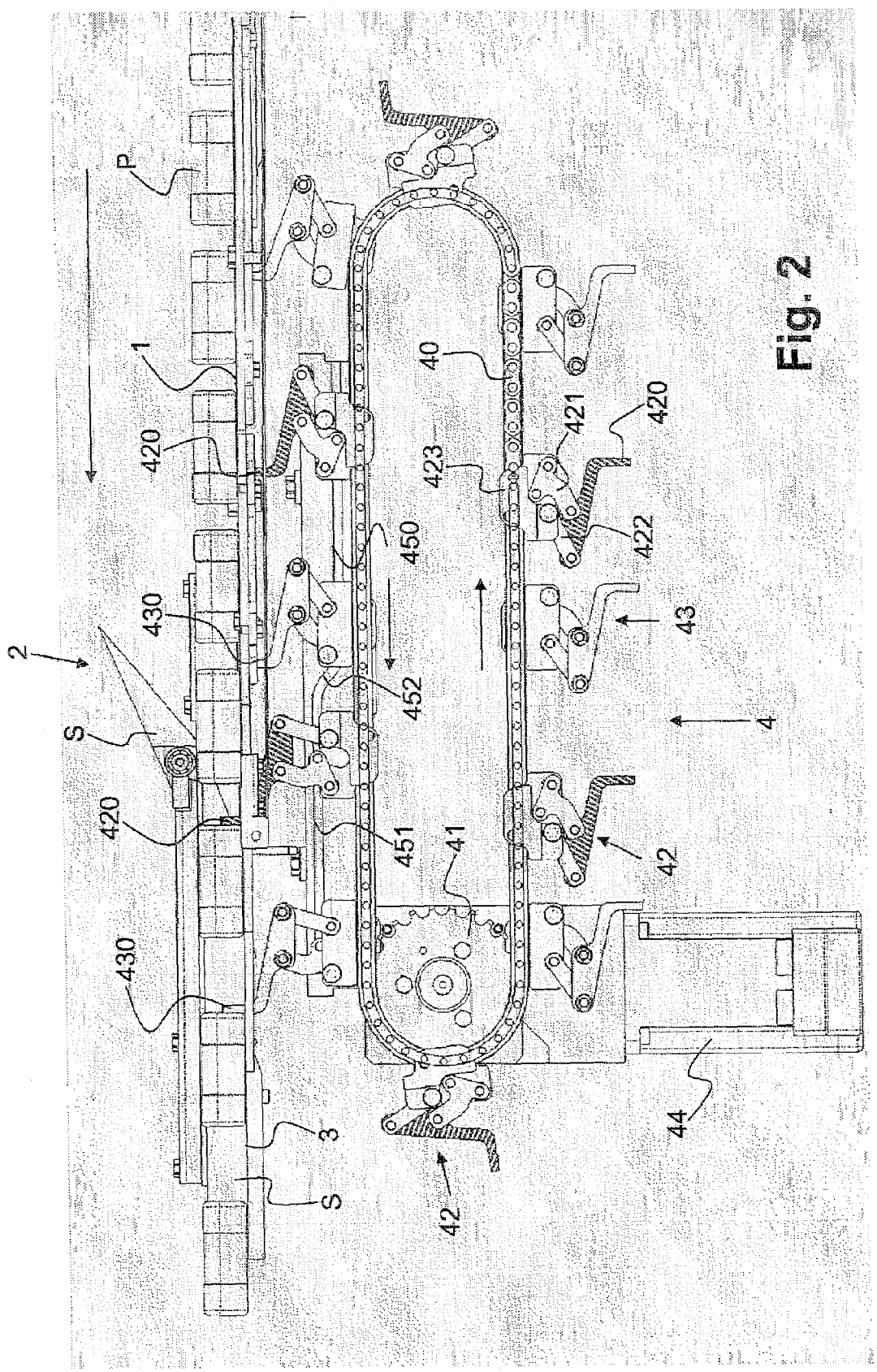
FIG. 2, the device and the packaging station of FIG. 1 in a second conveying position.

In FIG. 2, it can now be seen what then happens with the first and second frontmost driver elements 42, 43. The second driver element 43, which is still in the lead, is still in driving engagement with its bulk product P. However, in the meantime, the first driver element 42, following the second one, has reached the raised span portion 451 and is transporting its bulk product P. The other driver elements of these two conveyor chains 40, 40' are located, as before, below the conveyor path and are not in any kind of driving engagement with bulk products P.

Figure 3:
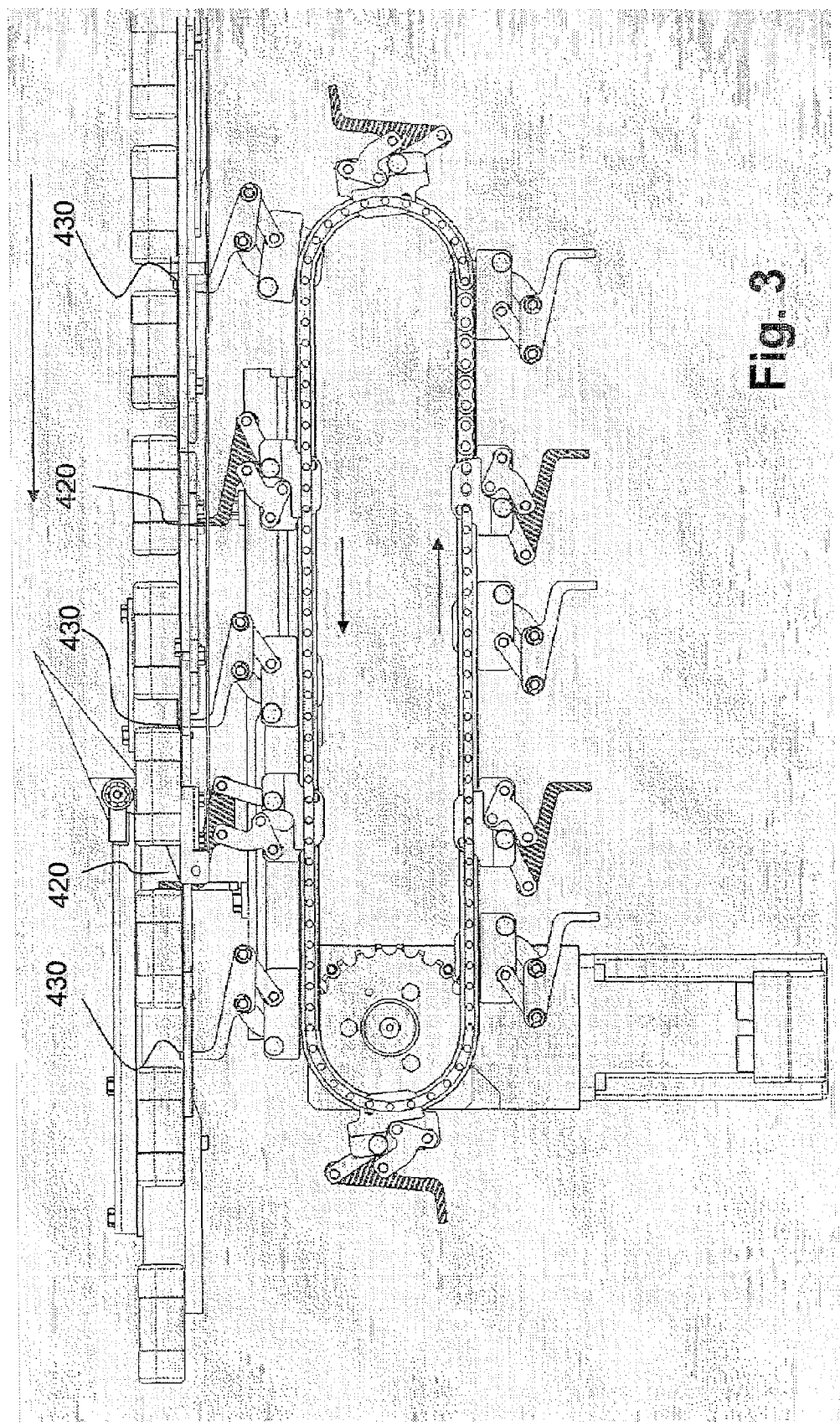
FIG. 3, the device and the packaging station of FIG. 1 in a third conveying position.

In the conveying position shown in FIG. 3 and defined at a later time, the leading, second driver element 43 has now reached the final span 453 and is lowered. As can be seen, its bulk product P is now transported solely by the packaging material S. For this purpose, the next second driver element 43 on this conveyor chain 40' is located on the ramp 452 and is raised and is about to take on the task of transporting its bulk product P.

In the example described here, the individual speeds of the driver elements 42, 43 are determined by the conveying speed of the individual chain conveyors 40, 40'. These are preferably driven by servo motors. The chain conveyors 40, 40' are controlled here independently of one another via a controller as a function of sensor signals, which contain the position of the individual bulk products P. To attain precise positioning of the bulk products P on the packaging material S, all the bulk products P are preferably pushed by driver elements 42, 43, and the speed at which the pushing is done depends on the position, detected earlier, of the bulk product P. In this example, the raising and lowering of the individual driver element arms 420, 430 is attained by mechanical means, in the form of slide tracks 45.

The different speeds of the driver elements 42, 43 and their raising and lowering may, however, also be attained by other means. In particular, all the driver elements may be raised or lowered. For example, it is also possible for each driver element 42, 43 to be driven by its own motor, with the motor causing the raising and lowering and/or pushing forward of the driver element 42, 43.

The device and the method of the invention thus make it possible to shorten the delivery span of a packaging machine while at the same time increasing the positional precision of the individual bulk products.

The foregoing relates to a preferred exemplary embodiment of the invention, it being understood that other variants and embodiments thereof are possible within the spirit and scope of the invention, the latter being defined by the appended claims.

The invention claimed is:

1. In a feeding device of a packaging machine for feeding bulk products into a packaging station of this machine, in which the feeding device has at least one endlessly revolving conveyor with at least one driver element for driving the bulk products to be fed along a conveyor path, the improvement wherein the feeding device is embodied such that, per conveyor, only a single one of the at least one driver element can be put simultaneously in a position for driving a bulk product to be fed, wherein the feeding device comprises at least two conveyors extending approximately parallel to one another; and wherein the at least two conveyors can be operated at different conveying speeds.

2. The device as defined by claim 1, further comprising means for putting each of the at least one driver element individually into the conveyor path and individually removing each driver element from the conveyor path.

3. The device as defined by claim 2, wherein the means for putting each of the at least one driver element individually into the conveyor path and individually removing each driver element from the conveyor path comprises a slide track.

4. The device as defined by claim 1, wherein the at least one driver element extends in or above the conveyor path.

5. The device as defined by claim 2, wherein the at least one driver element extends in or above the conveyor path.

6. The device as defined by claim 1, further comprising a sensor operable to detect the position of the bulk products to be individually fed, the sensor being disposed upstream, in the conveying direction, of the at least one revolving conveyor.

7. The device as defined by claim 2, further comprising a sensor operable to detect the position of the bulk products to be individually fed, the sensor being disposed upstream, in the conveying direction, of the at least one revolving conveyor.

8. The device as defined by claim 1, further comprising an accelerating conveyor disposed upstream, in the conveying direction, of the at least one conveyor.

9. The device as defined by claim 2, further comprising an accelerating conveyor disposed upstream, in the conveying direction, of the at least one conveyor.

10. A method for feeding bulk products into a packaging station of a packaging machine, in which the bulk products are fed to the packaging station along a conveyor path and engaged individually and spaced apart from one another by driver elements provided on at least two conveyors extending approximately parallel to one another, characterized in that per conveyor, only a single driver element simultaneously transports a bulk product that is to be fed, the method comprising the step of operating the at least two conveyors at different conveying speeds.

11. The method as defined by claim 10, wherein each driver element, before it transports a bulk product along the conveyor path, is brought to a predetermined conveying speed, and the conveying speed is selected as a function of the position of the bulk product to be transported by it.

12. The method as defined by claim 10, wherein each driver element, upon the transfer of the bulk product transported by it to a transporting means of the packaging station, has the same speed as this transporting means.

13. The method as defined by claim 11, wherein each driver element, upon the transfer of the bulk product transported by it to a transporting means of the packaging station, has the same speed as this transporting means.

* * * * *